United States Patent
P

(10) Patent No.: US 9,911,315 B2
(45) Date of Patent: Mar. 6, 2018

(54) PERSONALIZED REAL TIME OUTDOOR GUIDANCE APPLICATION FOR MASS EVACUATION

(71) Applicant: Honeywell International Inc., Morristown, NJ (US)

(72) Inventor: Ranjith Kumar P, Tirunelveli District (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 15 days.

(21) Appl. No.: 14/744,347

(22) Filed: Jun. 19, 2015

(65) Prior Publication Data

US 2016/0371966 A1  Dec. 22, 2016

(51) Int. Cl.
| | |
|---|---|
| G08B 1/08 | (2006.01) |
| G08B 27/00 | (2006.01) |
| G01C 21/34 | (2006.01) |
| G01C 21/36 | (2006.01) |

(52) U.S. Cl.
CPC ....... G08B 27/006 (2013.01); G01C 21/3415 (2013.01); G01C 21/362 (2013.01); G08B 27/005 (2013.01)

(58) Field of Classification Search
CPC ....... H04W 4/02; G06Q 90/205; G08B 21/10; G08B 27/005; G08B 27/006
USPC .............. 340/539.13, 628, 601, 632, 286.05; 455/404.2, 404.1
See application file for complete search history.

(56) References Cited

U.S. PATENT DOCUMENTS

| | | | |
|---|---|---|---|
| 2007/0049259 A1* | 3/2007 | Onishi | A62B 99/00 455/414.2 |
| 2009/0138353 A1 | 5/2009 | Mendelson | |
| 2012/0190295 A1* | 7/2012 | Kim | G06Q 10/06 455/3.01 |
| 2013/0060729 A1 | 3/2013 | Massey | |
| 2014/0129135 A1 | 5/2014 | Holden et al. | |
| 2014/0222329 A1* | 8/2014 | Frey | G08B 7/066 701/423 |

(Continued)

FOREIGN PATENT DOCUMENTS

| | | |
|---|---|---|
| CN | 102737471 A | 10/2012 |
| JP | 2004-318684 A | 11/2004 |

(Continued)

OTHER PUBLICATIONS

English language translation of abstract of CN102737471 (A), Oct. 17, 2012.

(Continued)

*Primary Examiner* — Phung Nguyen
(74) *Attorney, Agent, or Firm* — Husch Blackwell LLP

(57) ABSTRACT

A system including is provided that includes a cloud application executing on a cloud processor that detects an evacuation message, a portable device that receives a notification from the cloud application of the evacuation message, a processor of the cloud application that determines a current geographic location of the portable device and an evacuation destination for the portable device and that downloads a map to the portable device showing a route from the current location to the evacuation destination, and a processor that updates the map based upon real-time events occurring along the route.

15 Claims, 6 Drawing Sheets

(56) References Cited

U.S. PATENT DOCUMENTS

2014/0282934 A1     9/2014  Miasnik et al.
2014/0368337 A1*   12/2014  Venkatachari ....... G08B 27/008
                                                                340/539.13
2016/0047663 A1*    2/2016  Iyer ................... G01C 21/3415
                                                                701/411
2016/0189543 A1*    6/2016  Altintas ................. H04W 4/22
                                                                340/905

FOREIGN PATENT DOCUMENTS

WO     WO 2010/111442 A1    9/2010
WO     WO 2014/053023 A1    4/2014
WO     WO 2015/057187 A1    4/2015

OTHER PUBLICATIONS

English language translation of abstract of JP2004318684 (A), Nov. 11, 2004.
Extended European search report for corresponding EP patent application 16173170.8, dated Nov. 10, 2016.

* cited by examiner

PERSONALIZED REAL TIME OUTDOOR GUIDANCE APPLICATION FOR MASS EVACUATION

FIELD

This application relates to public safety and, more particularly, to systems for notification of mass evacuations.

BACKGROUND

Systems are known to protect people in the case of public emergency. For example, a toxic gas leak or risk of explosion may necessitate the need for evacuation of entire blocks of houses in a city or even the entire cite.

Such systems are typically based upon the use of one or more civil defense sirens that may be activated in the event of emergency. Upon the activation of such systems, people often turn on their radios or televisions to learn of the extent of the emergency, or they contact a local police department for instructions on how to reach a place of safety. Upon receiving instructions, residents may walk or drive to the place of safety.

Recent improvements in this area include the use of the telephone system. Using these resources, a local authority (e.g., police department, civil defense, etc.) may activate an electronic dialing system that places calls to individuals within the threatened area notifying them of the emergency.

Alternatively, at least some municipalities maintain a website of publically available information. Upon receiving a notice of a public threat, people may go to the website to obtain information about the threat and evacuation destinations.

While such systems are effective, instructions provided by such systems can be inadequate or misunderstood. In the event of a rapidly developing situation, a local police department may not be aware of the full extent of the danger. Alternatively, the area of the threat may grow, or the site may change based upon environmental conditions. For example, a fire may break out in a neighborhood and spread rapidly because of strong winds. Alternatively, an evacuation plan may be implemented for a hurricane or typhoon on one day, and on the next day or hour, the path of the storm may change. Accordingly, a need exists for better methods of promulgating evacuation information.

DETAILED DESCRIPTION

Figure 1:
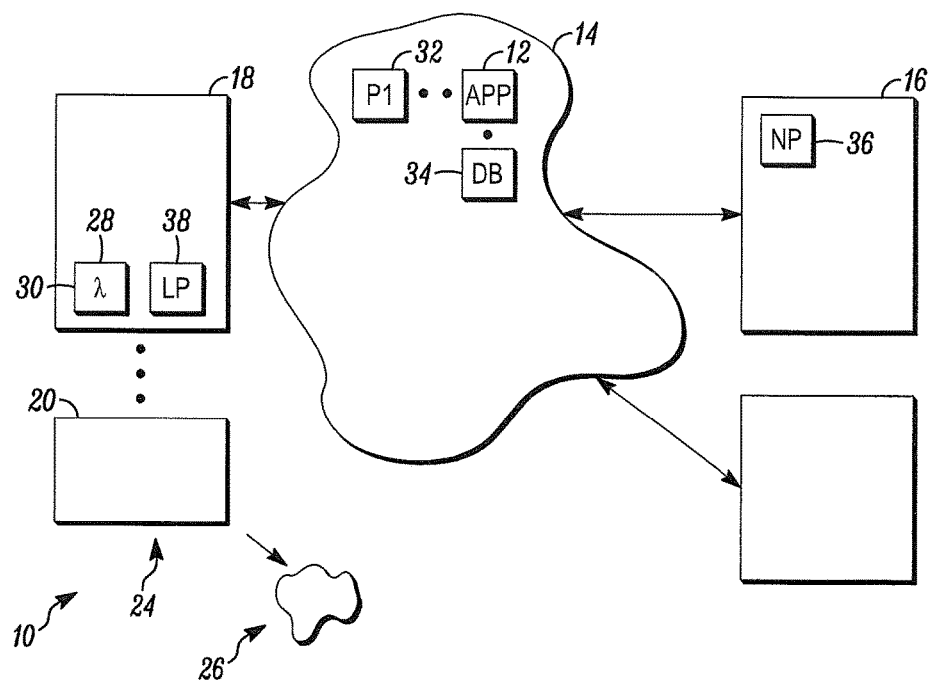
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of an evacuation guidance system 10 shown generally in accordance with an illustrated embodiment. The guidance system may operate through the Internet and guide wireless subscribers to evacuation destinations in real time. For example, FIG. 1 shows a cloud application 12 operating on the Internet 14. The cloud application receives an initial evacuation notice through the Internet from a mass emergency notification system (MNS) 16 of one or more public safety organizations, determines a respective location of each portable wireless device 18, 20, and guides one of the portable devices from its current location 24 to one or more evacuation destinations 26.

In order to facilitate guidance of the portable device, the cloud application retrieves a geographic map 28 of the current location of the portable device. The application then superimposes an evacuation route 30 onto the map connecting the portable device's current location and an appropriate evacuation destination.

The portable device may be embodied as any of a number of different types of devices (e.g., smartphone, load, etc.). The portable device displays the map along with the evacuation route that leads a user from the portable device's current location to the evacuation destination.

The cloud application then monitors information sources (e.g., social media) for travel impediments along the evacuation route. If an impediment occurs, then the cloud application dynamically changes the evacuation route.

In this regard, the cloud application and each of the portable devices may include one or more computer programs executed on one or more processor apparatuses (processors) 32. As used herein, a reference to a step performed by a computer program is also a reference to the processor that executed that step.

In order to receive evacuation information, the portable devices may register with the cloud application for service. Once registered, a system address (e.g., IP address, telephone number, etc.) of the portable device is saved by the cloud application within a cloud database 34 of the cloud application.

During normal operation, a monitoring processor of the cloud application and a notification processor 36 of the public safety organization operate to transfer disaster notifications to the cloud application. Under one embodiment, the notification processor is a website monitored by the monitoring processor for disaster notification messages posted to the website. Under another embodiment, the public safety organization includes a messaging application that sends instant messages to the monitoring processor containing disaster notifications.

The disaster notifications may include a set of geographic coordinates of a disaster area, a scope of the evacuation, a recommended evacuation destination, an indication of the type of a disaster, and a time of occurrence of the disaster. Alternatively, the disaster notification may simply be a link to the disaster information. Under other embodiments, the disaster notification may include more or less information.

Upon receipt of the disaster notification, a location processor may determine a location of each portable device registered with the cloud application. The location processor may do this by searching for and retrieving a most recently saved set of geographic coordinates of each portable device from the cloud database in the case where the portable devices periodically register their location. Alternatively, the location processor may send a location request to each of the portable devices. In this case, a corresponding location processor 38 (e.g., a global positioning system (GPS) device, etc.) in the portable device may determine the geographic coordinates of the device and transfer that information to the cloud application.

Once the cloud application has the position of each portable device, a destination processor may determine the appropriate evacuation destination of the portable device. In some cases, the evacuation destination provided within the initial evacuation notification may be the same is the determined evacuation destination. This may be the case if the initial evacuation notification message was from a local police department and the portable device was found to be within the same area protected by the local police department.

Alternatively, if the initial evacuation notification was from a city-wide or region-wide public service organization, then the destination processor may follow a different procedure. In this case, the destination processor may determine if the destination in the recommended evacuation notification is in the same direction as the location of the disaster. If this is the case, then the destination processor may seek to identify a different evacuation destination. To this end, the destination processor may first identify a zip code of the portable device's current location and then search for local public service organizations (e.g., police departments, hospitals, etc.) in the same zip code.

Once a local public service organization has been identified, the destination processor may retrieve a new evacuation destination from the local public service organization and adopt this new destination. Once an evacuation destination has been adopted, a routing processor may plot a route from the portable device's current location and download the route to the portable device. Alternatively, a human user of the portable device may choose his/her own evacuation destination.

Once a route has been established, a rerouting processor may monitor the route for obstructions or other impairments and reroute as necessary. In this regard, the rerouting processor may monitor one or more news or social networking sites for information about traffic/pedestrian flow. For example, if the routing processor should plot a route along a street (e.g., Main Street) in an area toward the evacuation destination, then the rerouting processor may search for postings related to Main Street and for the words "closed" or "accident" or other words indicating impairment of the route. Upon detecting an incident of this type, the rerouting processor may change the plotted route to avoid the impairment.

In general, conventional systems have a number of disadvantages over the system of FIG. 1. The primary disadvantage lies in the lack of personalized outdoor evacuation guidance integrated with mass public notification systems and of real time information specific to an individual's location. Conventional state of the art systems evacuate the user/individual by using a centralized, public addressing system based upon civil defense sirens or radios that provide real time localized information for evacuation.

However, information from conventional evacuation systems can often lead to panic. Panic can be caused by uncertainty and by the search for a safe route/direction away from a hazard. In the event of the sudden on-set of the hazard, guidance is missing in outdoor areas that is based on real time information guiding people on-route towards the safest route/area. Often a great deal of time is lost in the search for help and in waiting for real time updates from the mass notification system (MNS).

Even when real time updates are available from MNS resources, they are often not effective because they are not directed to the circumstances of an individual person. Mass/emergency notification systems are not integrated with the GPS devices of individuals and the real time hazard information pertaining to the preferred evacuation route/destination of individuals so that they are tracked/guided while moving towards safe areas.

In most cases, individuals only have the evacuation information provided by MNS resources even though it is often ineffective as time passes for outdoor evacuation. For example, the communication is only one-way. It is often not associated with real time graphical maps that take account for local hazards that occur later along the evacuation route. Individuals often cannot go to the safest area from their current position along a static path by manually following GPS instructions because of unexpected obstructions.

Cell phones may not be of much help because messages to users may not always reach registered users. This may be the case because of network congestion caused by many people simultaneously requesting help during hazardous situations.

In some cases, people may be stuck in a specific location (e.g., invalids in hospitals, nursing homes, etc.). Often, these people cannot be identified/monitored. There is no tracking mechanism for users for outdoor evacuations in such cases.

Arguably, a simplified solution that considers the individual's location could be integrated with MNS resources to provide real time information to people in outdoor situations, sites, or other geographic locations by communicating what to do in response to later occurring threats. However, this simplified solution would not have sufficient direction (such as a guidance map) to move towards safe areas by considering later occurring events not captured by an MNS system.

In general, the system of FIG. 1 instructs the individual to evacuate from outdoor areas through the best possible routes from their current position by using GPS information along with real time hazard and destination information received from the MNS and real time events from social media. Under illustrated embodiments, a smart application in the device continuously updates the cloud on device location for subsequent routing towards and along the safest exit path as the individual moves onward towards the evacuation destination.

The system's functionality is based upon the use of hand-held devices (e.g., smart phones) having a mapping capability, but is not limited to smart phones. MNS alerts provided on the map from the cloud application are dynamically indicated along with a travel route on a hand-held device's GPS map for convenient evacuation.

Applications executing on a smart phone can receive currently active NMS alerts from the cloud application and can find a location of contact service agencies (e.g., hospital, police, fire service, other helping service agencies, etc.) where needed. The applications executing on the smart phone can also generate alerts and distribute those alerts to members of a friends circle on social media along with a current location.

The cloud application provides real time GPS maps on outdoor evacuation routes to the hand-held devices and updates map information on a real time basis in order to indicate any obstructions on the path. The applications (both cloud and device) may also be used to perform dynamic rerouting based on the latest hazard on any of the previously selected best evacuation path in the outdoor area as per the devices' location.

The user benefits because the hand-held devices are loaded with graphical displays and provide real time GPS maps as per the real time event and as per the real time hazard situations retrieved or otherwise detected from social media monitoring. Audible messages may also be provided by the hand-held devices for step by step evacuation guidance towards the safest area.

The smart applications of the evacuation guidance system can be installed on multiple smart devices and activated by registering and authenticating the respective devices with the cloud application. In the case of communication failure with conventional MNS sources due to mobile network congestion, the smart applications can access evacuation information from the cloud application through other possible means of Internet connectivity, such as making use of public WiFi, etc. The smart applications executing on the portable devices can receive alerts and generate potentially life-saving instructions from the cloud application and can independently create directions towards the safest exits areas by using GPS maps, real time hazard information from social media networks, and the current location of the user.

The smart application on the portable device launches automatically when there is a MNS event detected in the outdoor area by the cloud application. The MNS event is used to update the GPS map in accordance with the event information received from the MNS and is used to provide instructions towards the safest exit path from the current location.

The real time information of evacuees who are stuck (i.e., stationary) in the outdoor area is updated to various roles by using their geographic location as a means of classification and monitoring. For example, a location can be used to identify invalids who may need special monitoring and help in evacuation.

The system may also be used as a means of providing efficient outdoor evacuation guidance via maps to special evacuees. These special evacuation maps could be provided by means of personal interactive evacuation applications that could offer help to a person who is new to an area and is confined in a particularly difficult GPS location during an MNS event.

Figure 2A:
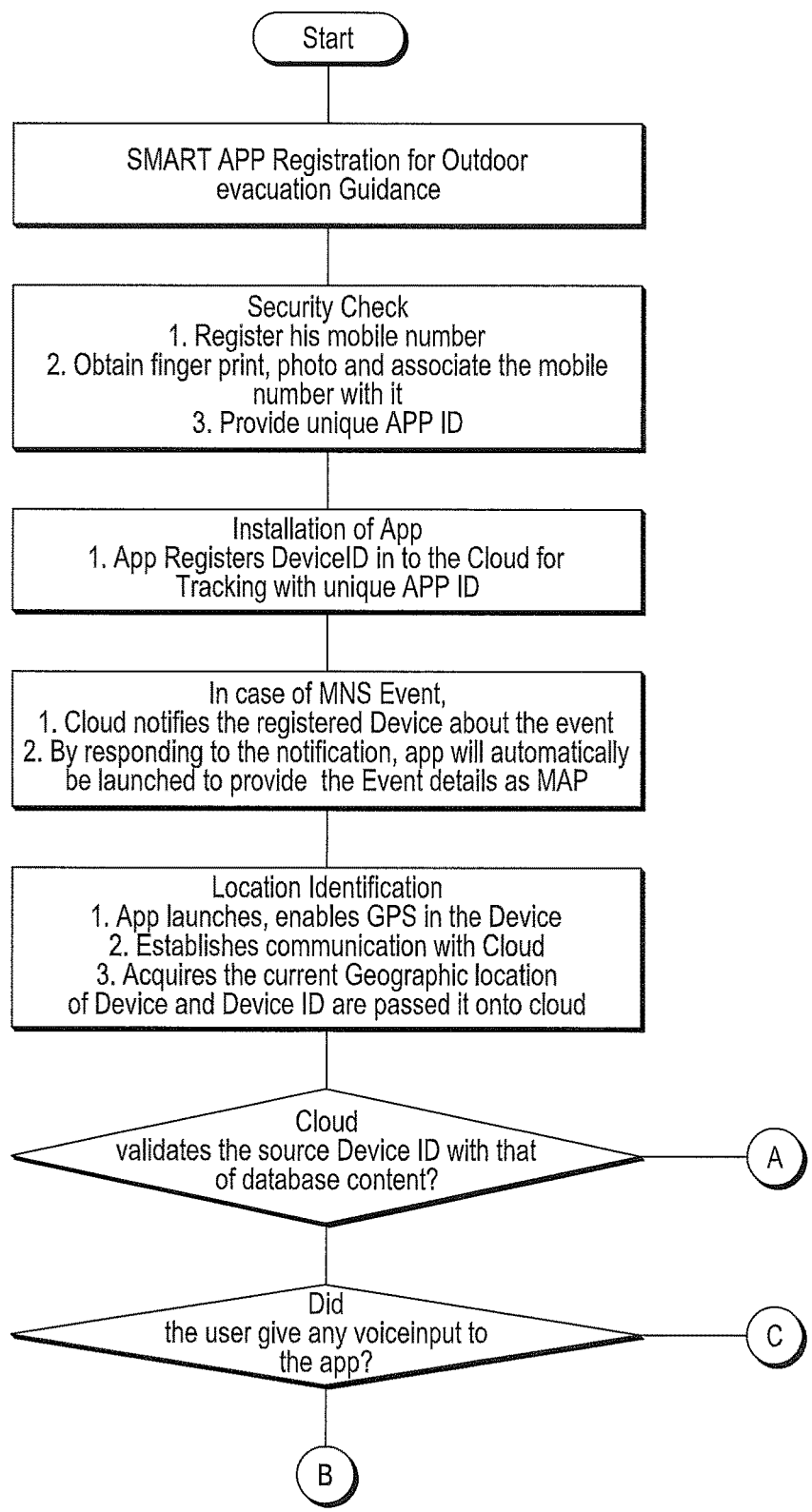
FIGS. 2A-2B illustrates a flow chart of steps that may be performed by the system of FIG. 1.
Figure 2B:
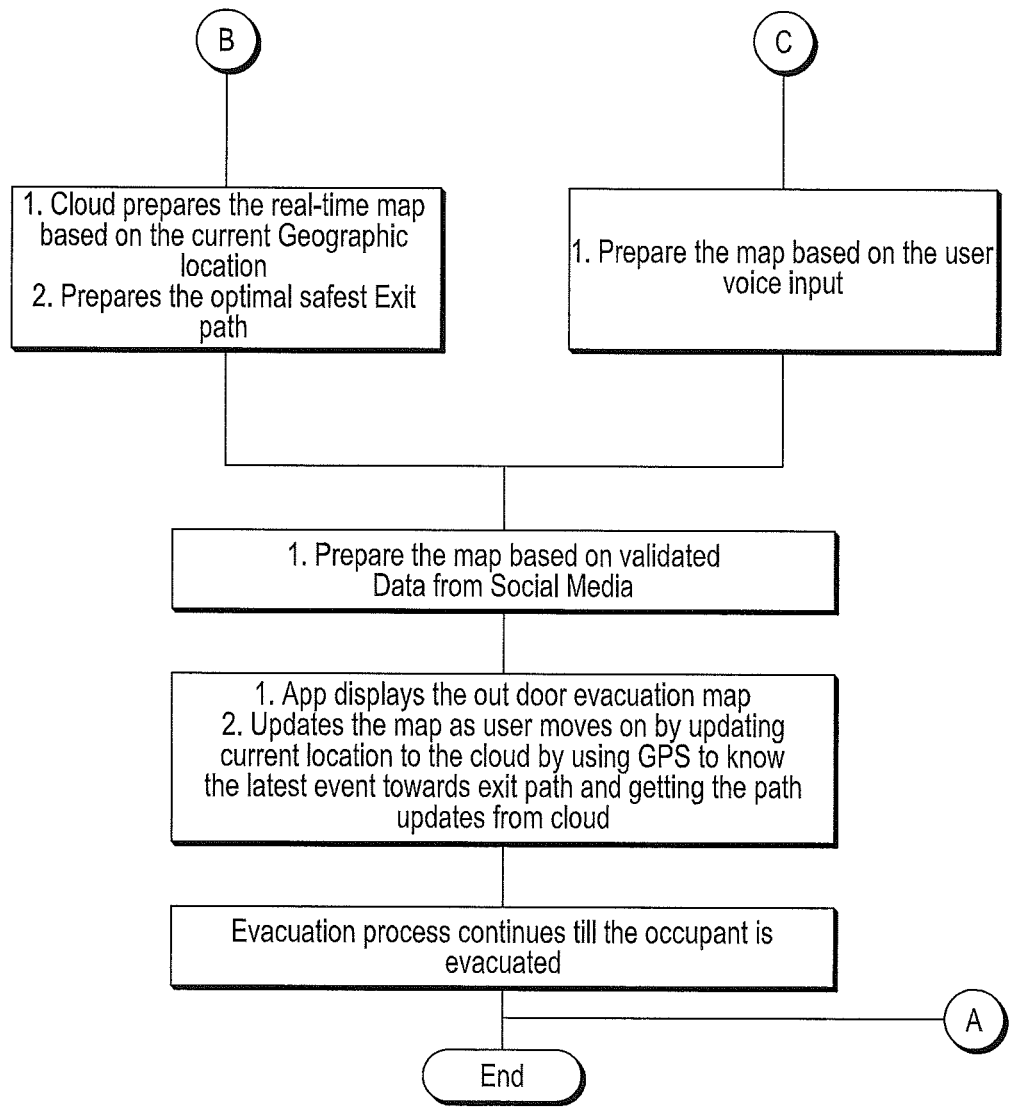
Figure 3:
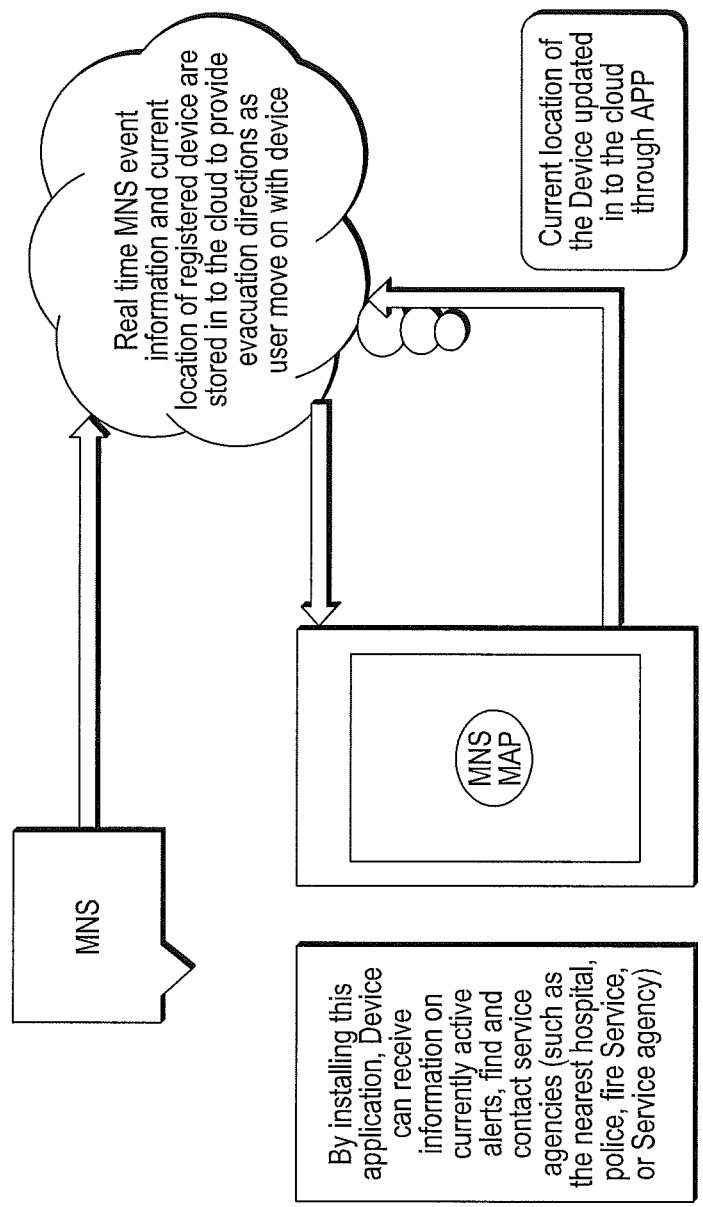
FIG. 3 depicts the flow of information between the MNS, the cloud application, and the portable device of FIG. 1.

FIGS. 2A-2B show further details of the process of the evacuation guidance system of FIG. 1. For example, the user may download the smart application for use with the cloud application from an appropriate software source (e.g., the Apple store). The user may activate the smart application, register his/her mobile number, obtain his/her fingerprint photo via a fingerprint reader on the portable device, and associate the mobile number with the portable device. The smart application may provide its own unique application ID. Once activated, the smart application registers the portable device ID with the cloud application for tracking along with the unique application ID.

Under the embodiment of FIGS. 2A-2B, the user may provide voice input to the process. In this case, the voice input may identify the evacuation destination or a preferred route to the destination. In other aspects, the process of FIGS. 2A-2B may be similar that that described above.

FIGS. 2A-2B show information flow among the MNS, the cloud application and the portable device. In this example, the MNS may provide evacuation events as well as travel obstructions to the cloud application. The MNS may also provide information on service agencies. The evacuation and travel obstructions and service information are saved in the cloud database for use in route generation. By registering with the cloud application, the portable device may receive evacuation information and retrieve information on service agencies.

The smart application within the portable device returns location information to the cloud application. In response, the cloud application provides the evacuation information displayed as the evacuation route superimposed over the geographic map.

Figure 4:
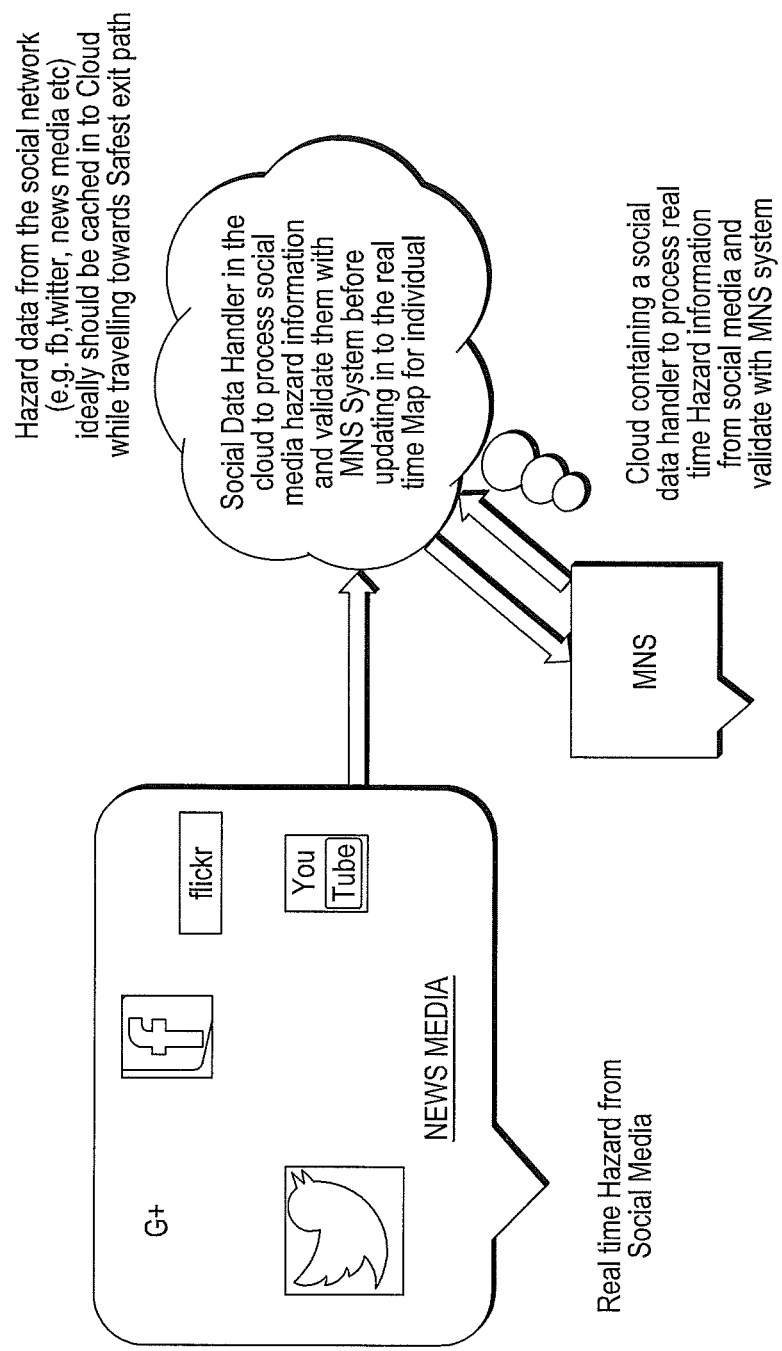
FIG. 4 depicts the flow and confirmation of social networking information used by the system of FIG. 1.

FIG. 4 depicts information flow among social networking sites, the cloud application, and the MNS. In this case, hazard data is cached into the cloud application by the portable device as the portable device travels along the evacuation path. The hazard data from the social networking sites is validated via the MNS.

Figure 5:
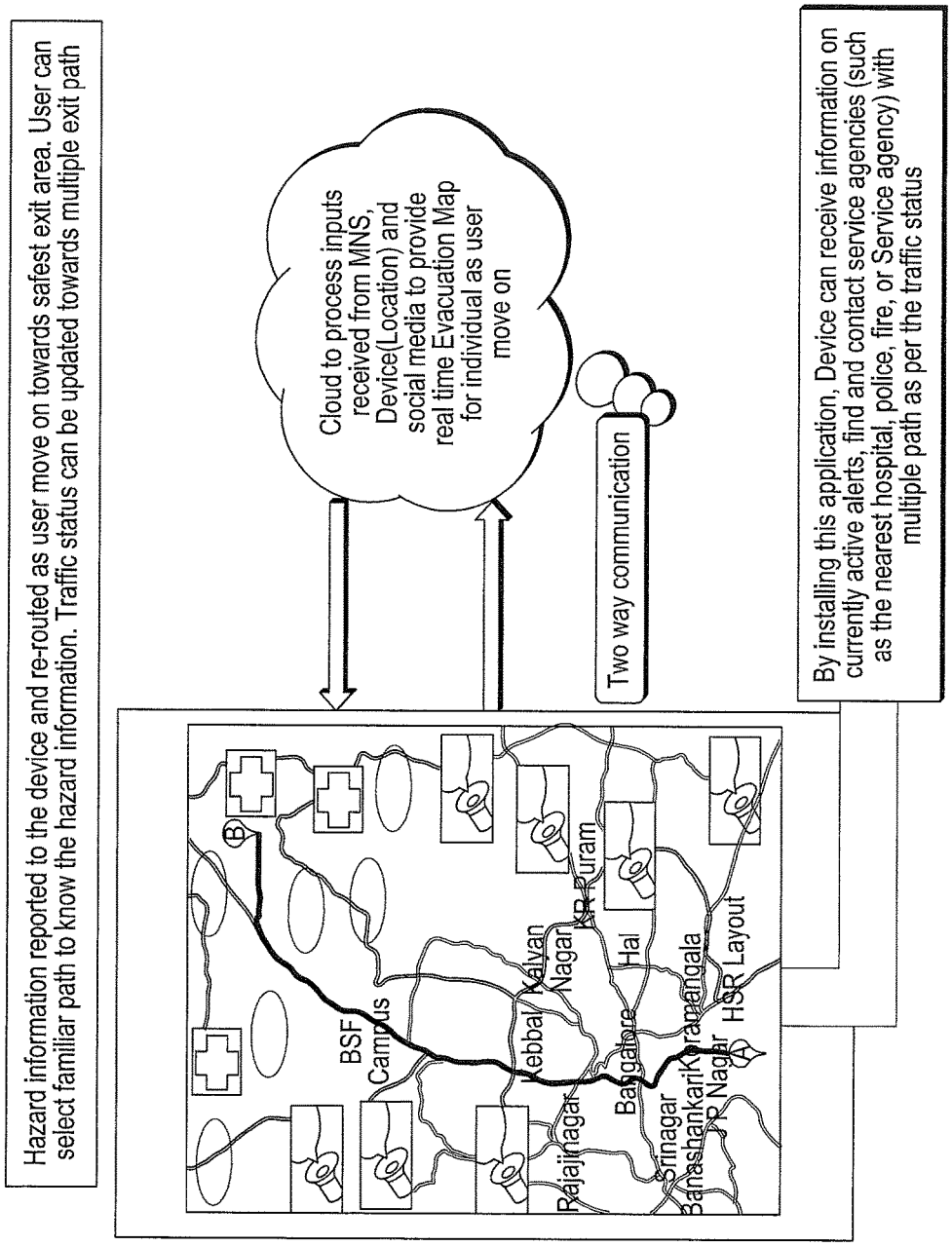
FIG. 5 depicts map generation performed by the system of FIG. 1.

FIG. 5 depicts map processing by the cloud application. In this case, the cloud application receives and processes hazard and service agency information from the MNS and hazard information from the social networking sites to provide updated map information. In this case, the exchange of information between the cloud application and the portable device is two-way. This allows the portable device to receive and display information on currently active events, find and contact service agencies, and change evacuation paths.

As noted above, the cloud application uses information from one or more social networking sites to validate real time events with the MNS. Alternatively, hazard information obtained through a social media application programming interface (API) may be used to obtain initial hazard information for confirmation through the MNS or may be used to confirm hazard information obtained from the MNS. In this case, government agencies or any other service provider near an event location may be used for confirmation.

By considering local hazard information, the cloud generates an optimal path based upon the context of the outdoor area. The local hazard information operates to provide real time updates as the user moves along the chosen path based upon many criteria, including choosing an optimal path from the current location of the user, avoiding real time hazards on the path, communication latency (reactions to real time hazards) in the overall system, and traffic status on an existing path. In addition, the ability to process interactive queries seeking alternative evacuation paths or destination locations or traffic status control operates to mitigate the risk of overall latencies in the system.

Since the system is able to handle hazards over large areas, it is able to handle any of a number of users. It may be supported by relatively high power and parallel processing platforms to handle peak loads.

In addition, the system may account for actively held portable devices in which the user promptly responds to notifications and for the possibility of unmanned devices. For example, unmanned hand-held devices may mislead rescue teams because they could indicate the possibility of someone stuck in an area by a physical disability or a lost or stolen smartphone. This could be addressed in a number of ways. After a stipulated time, the user could be prompted to activate a button that transmits a response beacon. When there is not response, a camera could be activated to obtain an update on the environment.

Alternatively, there could be a failure of a GPS module in a device leading to a failure of the location identification mechanism. In this case, the smart application could instruct the user to move slightly, or the cloud application could establish a two-way communication channel and receive a local address from the user in order to confirm an active status.

Security measures could be established to conserve resources. Security measures, such as multiple condition decision check (MCDC), could be incorporated into the cloud application to ensure the presence of authentic users. High security passwords, associated fingerprints, photographs, mobile/IEMI and device IDs, or application IDs are other options in ensuring proper security.

The system provides personalized outdoor evacuation guidance for individuals in the form of real time maps displayed on hand held portable devices, such as smartphones. The user can enter an address as a current location. This allows the user to virtually place himself/herself in a specific spot on the GPS map and allow the system to identify the nearest and most optimal evacuation path as per any updates of a MNS alert.

Optimal path finding algorithms operating on the cloud application operate by considering the real time hazards occurring on an identified path. Inputs, such as social media, location of the device, and interactive queries from the user, may be provided in the form of voice or touch commands to dynamically adjust the route. The voice or touch commands may be used in conjunction with outdoor location information from the user's smart device location (i.e., using GPS information) and periodically update the location information based on the user's movements. The updates along with real time MNS alerts saved into the cloud may all be used to generate and adjust the real time GPS map for evacuation.

The real time information of users who are confined by their physical condition and otherwise stuck to a particular location by their condition is updated based upon changes in current location information (e.g., lack of movement, movement too slow, etc.). The changes to the current location may be used to assign various states or conditions (e.g., needs help, must be monitored closely, etc.), and their initial geographic location (e.g., nursing home) may be used to provide a basis for further monitoring.

In general, the system includes a cloud application executing on a cloud processor that detects an evacuation message, a portable device that receives a notification from the cloud application of the evacuation message, a processor of the cloud application that determines a current geographic location of the portable device and an evacuation destination for the portable device and that downloads a map to the portable device showing a route from the current location to the evacuation destination, and a processor that updates the map based upon real-time events occurring along the route.

Alternatively, the system includes a cloud application executing on a cloud processor that detects an evacuation message from a public emergency notification service, a processor of the cloud application that determines a current geographic location of the portable device and an evacuation destination for the portable device and that downloads a map to the portable device showing a route from the current location to the evacuation destination, and a processor of the cloud application that updates the map based upon real-time events occurring along the route.

Alternatively, the system includes a cloud application executing on a cloud processor that detects an evacuation message from a public safety organization, a portable device that registers with the cloud application to receive the evacuation message, a processor of the cloud application that downloads a notification of the evacuation message to the portable device, a processor of the portable device that responds by sending a set of geographic coordinates of a current location of the portable device to the cloud application, a processor of the cloud application that downloads a geographic map to the portable device showing a route from the current location to an evacuation destination, and a processor that updates the route on the map based upon real-time events occurring along the route.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
a cloud application executing on a cloud processor that receives, from a mass emergency notification system, an evacuation message containing a first recommended evacuation destination and a location of a disaster; and
a portable device that receives an evacuation notification of the evacuation message from the cloud application,
wherein the cloud processor determines a current geographic location of the portable device and a second evacuation destination for the portable device that is based on the current geographic location, the first recommended evacuation destination, and the location of the disaster,
wherein the cloud processor downloads a map to the portable device showing a route from the current geographic location to the second evacuation destination for the portable device,
wherein the cloud processor updates the map based upon real-time events occurring along the route, and
wherein the cloud processor includes a social data handler that monitors one or more social media websites to identify and validate the real-time events occurring along the route with the mass emergency notification system before updating the map.

2. The apparatus as in claim 1 wherein updating the map includes changing a geographic path of the route, and wherein the real-time events occurring along the route block or otherwise impair the route.

3. The apparatus as in claim 1 further comprising a second processor of the portable device that uploads a set of geographic coordinates to the cloud application.

4. The apparatus as in claim 3 further comprising a global positioning system (GPS) device that provides the set of geographic coordinates.

5. The apparatus as in claim 1 wherein the cloud processor identifies contact services agencies that include at least hospitals, police stations, and fire departments.

6. The apparatus as in claim 1 further comprising a second processor of the portable device that sends a position notification of a current position of the portable device to a friends circle via social media.

7. An apparatus comprising:
a cloud application executing on a cloud processor that receives, from a public emergency notification service, an evacuation message containing a first recommended evacuation destination and a location of a disaster,
wherein the cloud processor determines a current geographic location of a portable device registered with the cloud application and a second evacuation destination for the portable device that is based on the current geographic location, the first recommended evacuation destination, and the location of the disaster, wherein the cloud processor downloads a map to the portable device showing a route from the current geographic location to the second evacuation destination for the portable device, wherein the cloud processor updates the map based upon real-time events occurring along the route, and wherein the cloud processor includes a social data handler that monitors one or more social media websites to identify and validate the real-time events occurring along the route with the public emergency notification service before updating the map.

8. The apparatus as in claim 7 wherein the real-time events include an obstruction impairing the route.

9. The apparatus as in claim 7 wherein updating the map includes changing a geographic path of the route, and wherein the real-time events block or otherwise impair the route.

10. The apparatus as in claim 7 wherein the cloud processor sends a notification of the evacuation message to the portable device.

11. The apparatus as in claim 10 further comprising a second processor of the portable device that responds to the notification by uploading a set of geographic coordinates to the cloud processor.

12. The apparatus as in claim 11 further comprising a global positioning system (GPS) device that provides the set of geographic coordinates.

13. The apparatus as in claim 7 further comprising a second processor of the portable device that sends a notification of a current position of the portable device to friends of a user of the portable device within a friends circle via social media.

14. An apparatus comprising:

a cloud application executing on a cloud processor that receives, from a public safety organization, an evacuation message containing a first recommended evacuation destination and a location of a disaster; and a portable device that registers with the cloud application to receive the evacuation message, wherein the cloud processor sends a notification of the evacuation message to the portable device, wherein a second processor of the portable device responds to the notification by sending a set of geographic coordinates of a current location of the portable device to the cloud processor, wherein the cloud processor downloads a geographic map to the portable device showing a route from the current location to a second evacuation destination for the portable device that is based on the current location, the first recommended evacuation destination, and the location of the disaster, wherein the cloud processor updates the route on the geographic map based upon real-time events occurring along the route, and wherein the cloud processor includes a social data handler that monitors one or more social media websites to identify and validate the real-time events occurring along the route with the public safety organization before updating the geographic map.

15. The apparatus as in claim 14 further comprising a global positioning system (GPS) device of the portable device that provides the set of geographic coordinates.

* * * * *